Dec. 31, 1935.　　　　　P. VAN CLEEF　　　　2,025,917
APPARATUS FOR USE IN THE MANUFACTURE OF SWAB EQUIPPED BOTTLE CLOSURES
Filed May 22, 1933
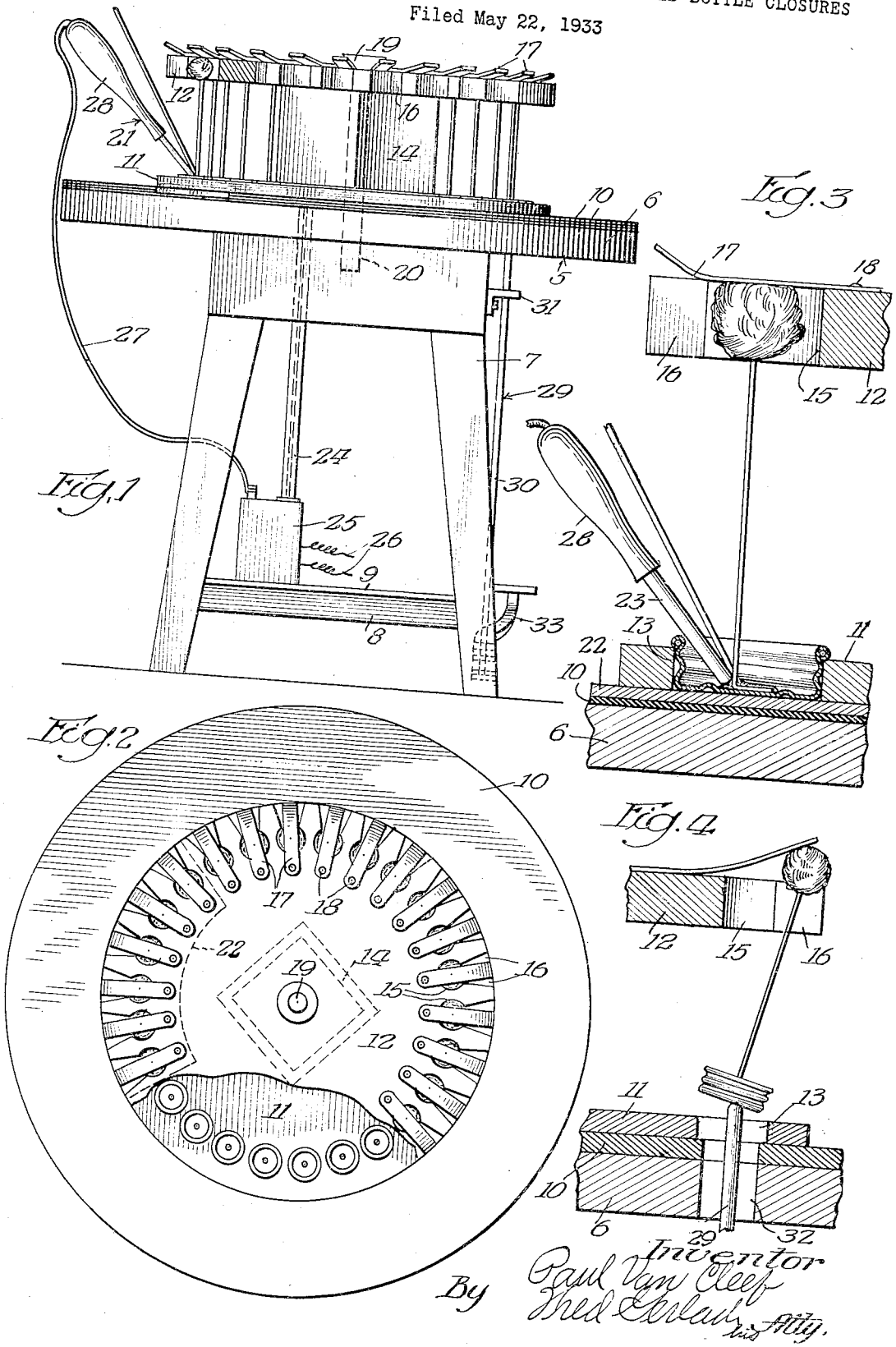

Patented Dec. 31, 1935

2,025,917

UNITED STATES PATENT OFFICE 2,025,917

APPARATUS FOR USE IN THE MANUFACTURE OF SWAB-EQUIPPED BOTTLE CLOSURES

Paul Van Cleef, Chicago, Ill., assignor to Van Cleef Bros., Chicago, Ill., a partnership consisting of Noah Van Cleef, Felix Van Cleef, Maxime Van Cleef, and Paul Van Cleef Application May 22, 1933, Serial No. 672,184

9 Claims. (Cl. 219—12)

The present invention relates to apparatus for use in the manufacture of bottle closures of the type which consists of a sheet metal screw cap for closing the mouth of the bottle and a depending wire stem which is soldered at its upper end to the top wall of the cap and has a swab at its lower end for use in applying or spreading the contents of the bottle.

One object of the invention is to provide an apparatus which is especially adapted for use in the manufacture of bottle closures of the aforementioned type, that is, in the attachment of the wire stems to the caps, and comprises a table and a pair of vertically spaced circular plates on the top of the table, the lower of which is provided with an annular series of circular sockets around the margin thereof for holding and receiving in an inverted position the sheet metal caps of the bottle closures and the upper of which is provided with a corresponding annular series of sockets for receiving the swabs of the closures and holding the wire stems in abutting relation with respect to the inner faces of the top walls of the caps and in position for soldering to the caps.

Another object of the invention is to provide an apparatus of the aforementioned character which includes a device at one side of the table for heating the sheet metal caps for soldering purposes and in which the vertically spaced plates are conjointly rotatable on the table top so that the bottle closures may be rotated successively into the range of the heating device.

Another object of the invention is to provide an apparatus of the type and character under consideration in which the device at one side of the table for heating the caps for soldering purposes comprises (1) a sheet of aluminum or other electrical conductor material which is mounted on the top of the table and underlies the lower plate in such a manner that it is in direct engagement with the top walls of the caps and is connected to one side of a source of electric current; and (2) a carbon electrode which is connected to the other side of the source of current by a flexible conductor and is adapted when placed in contact with the caps engaging the aluminum strip to become heated by a completion of the electric circuit and thus to heat the caps.

A further object of the invention is to provide an apparatus for use in connection with the manufacture of bottle closures of the swab-equipped cap type in which the upper plate with the sockets for receiving the swabs embodies on the top face thereof an annular series of leaf springs for engaging the swabs and holding the stems in abutting relation with respect to the top walls of the caps and the bottle closures after attachment of the wire stems to the screw caps are ejected from the sockets in the plates by means of an ejector which is located substantially diametrically opposite the heating device.

A still further object of the invention is to provide an apparatus of the type and character under consideration which is generally of new and improved construction and is efficient in operation.

Other objects of the invention and the various advantages and characteristics of the present apparatus will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a view partly in side elevation and partly in section of the improved apparatus;

Figure 2 is a plan view, parts being omitted for purposes of illustration;

Figure 3 is a sectional view illustrating in detail the manner in which the upper and lower plates hold the wire stems in abutting relation with respect to the screw caps for soldering purposes; and Figure 4 is a section of a portion of Figure 2 and illustrating the construction and arrangement of the ejector for discharging the bottle closures after attachment of the stems to the caps.

The apparatus which forms the subject matter of the invention consists of a table 5 and is designed for use in assembling bottle closures of the screw-cap, swab-equipped type. In these closures, as shown in the drawing, the caps are formed of sheet metal and consist of circular top walls and integral depending skirts with screw threads for connection to the necks of the bottles with which the closures are applied. In addition, the swabs are connected to the caps by means of wire stems which depend from the caps and have their lower ends looped or otherwise connected to the swabs and their upper ends bent at right angles and soldered directly to the inner faces of the top walls of the caps. The apparatus is adapted for use in connection with the soldering of the upper ends of the wire stems to the top walls of the caps. The table 5 which forms a part of the apparatus consists of a circular top 6 and a plurality of legs 7 for supporting the top in an elevated position with respect to the surface or floor on which the table is positioned. The legs 7 are connected at the upper ends thereof to the central portion of the table top and are reinforced or braced by means of cross members 8. The latter extend between the lower ends of the legs as shown in Figure 1 and support a platform 9. The top 6 of the table is preferably formed of wood or any like material and is provided with a covering 10 of electrical insulating material.

The apparatus, in addition to the table 5, comprises a pair of circular plates 11 and 12. The plate 11 is centrally positioned on the top 6 of the table. It is formed of insulating material and is provided around the margin thereof with an annular series of holes forming cylindrical sockets 13. These sockets extend completely through the plate 11 and are shaped to receive and hold in an inverted position the caps of the bottle closure. The plate 12 is the same in diameter as the plate 11 and is supported directly above the plate 11 by means of a block 14. This block extends between and is secured fixedly to the inner faces of the two plates and serves to support the plates in vertically spaced relation. The plate 12, like the plate 11, is formed of insulating material of any suitable character. It is arranged concentrically with respect to the plate 11 and embodies around the margin thereof an annular series of holes forming sockets 15. These sockets correspond in number to, and are vertically aligned with, the cap-receiving sockets 13 in the plate 11 and are adapted to receive the swabs on the wire stems of the bottle closures and to hold the stems, as shown in Figure 3 of the drawing, in abutting relation with respect to the inner faces of the top walls of the screw caps and in position for soldering to the caps. The circular plate 12 is spaced from the plate 11 by the block 14 a distance equal to the height of the wire stems of the closures. The sockets 15 in the margin of the plate 12 are provided with flared mouths 16 whereby the swabs on the wire stems of the bottle closures may be inserted into and removed from the sockets 15. In assembling the bottle closures, the caps are placed in an inverted position in the sockets 13 in the plate 11. The wire stems are then placed with the bent ends thereof against the inner faces of the top walls of the caps and are swung inwardly in order to bring the swabs within the sockets 15 in the plate 12. Thereafter, the bent ends of the wire stems are soldered to the caps as hereinafter described. In order to hold the swabs in the sockets 15 and press the bent ends of the wire stems into firm contact with the inner faces of the top walls of the caps, leaf springs 17 are carried by the plate 12. These springs extend over the tops of the sockets 15 and radially with respect to the plate 12 and are anchored at their inner ends by means of screws 18 or other attaching devices. The outer ends of the springs overlie the flared mouths 16 for the sockets 15 and are bent upwardly, as shown in the drawing, so as to facilitate entry and removal of the swabs with respect to the sockets 15. The springs 17 are arranged so that when the swabs are in place in the sockets 15 they bear downwardly against the swabs and hold the bent ends of the wire stems firmly against the inner faces of the top walls of the screw caps, as previously pointed out. In order to facilitate assembly and soldering of the bottle closures by two people at opposite sides of the table, the plates 11 and 12 are mounted so that they are conjointly rotatable around a vertically extending pin 19. This pin extends through the block 14 and aligned holes in the plates 11 and 12 and has the lower end thereof fixed in any suitable manner in a socket 20 in the table top 6.

For the purpose of heating the screw caps in the sockets 13 for soldering purposes, a heating device 21 is located at one side of the table 5. This device consists of a sheet 22 and a carbon electrode 23. The sheet 22 is embedded in the covering 10 of insulating material on top of the table top 6 and is positioned under the marginal part of the plate 11 and so that the top faces of the screw caps of the bottle closures are brought into contact therewith during rotation of the plates 11 and 12. It is formed of aluminum or any other suitable electric current conducting material and is connected by a conductor 24 to one side of a transformer 25 which is mounted on the platform 9 under the table top 6 and is supplied with current through the medium of a pair of line conductors 26. The conductor 24 is soldered or otherwise secured to the under face of the sheet 22 and leads downwardly through the top of the table. The carbon electrode 23 is connected by a flexible conductor 27 to the other side of the transformer 25 and is provided with a wooden handle 28 whereby it may be manipulated into contact with the caps engaging the sheet 22. When the electrode 23 is brought into engagement with any one of the caps on the sheet 22, a circuit is completed through the transformer and the electrode becomes hot and in turn heats the cap so that by applying solder thereto the bent end of the wire stem above the cap may be soldered in place. As soon as the electrode is taken away from the cap, the circuit is broken with the result that the electrode cools. It is contemplated that an operator standing alongside of the table will manipulate the device 21 and solder the wire stems to the caps as the plates 11 and 12 are rotated and the bottle closures are brought in rotative succession into range of the heating device 21. It is also contemplated that a second operator standing directly opposite the first will assemble the bottle closures by first inserting the caps in an inverted position into the sockets 13 in the plate 11 and then manipulating the wire stems so as to bring the bent ends thereof into abutting relation with the inner faces of the top walls of the caps and the swabs into place in the sockets 15 around the margin of the plate 12.

In order to dislodge the bottle closures from the plates 11 and 12 after soldering of the wire stems to the screw caps, an ejector 29 is provided. This ejector is located substantially diametrically opposite the heating device 21 and comprises a vertically extending rod 30. The latter is slidably mounted in a bracket 31 and extends at the upper end thereof through a hole 32 in the table top 6. This hole is located so that the sockets 13 are brought successively into registry therewith during rotation of the plates 11 and 12. A foot pedal 33 serves to shift the rod 30 vertically. This pedal is pivotally connected to a bracket on the lower end of one of the legs 7 of the table 5 and is adapted when depressed, to raise the rod 30. When the plates 11 and 12 are rotated so as to bring one of the sockets 13 into registry with the hole 32, the bottle closure associated with the socket may be dislodged or discharged by depressing the pedal 33. When the pedal is depressed, the rod is raised so that the upper end thereof moves into engagement with the cap and forces the cap upwardly as indicated by dotted lines in Figure 1.

The operation of the apparatus is as follows:

The caps of the bottle closures are first inserted in an inverted position into the sockets 13 around the margin of the plate 11. This is preferably done by an operator standing alongside of the ejector 29. After insertion of the caps into the sockets 13, the wire stems of the bottle closures are manipulated by the operator so as to bring the bent ends into abutting relation with the inner faces of the top walls of the caps and the swabs into place in the sockets 15 around the margin of the plate 12. The bottle closures, after assembly thereof, are moved successively into the range of the heating device 21 by rotating the plates 11 and 12. The operator in charge of the heating device and the soldering of the wire stems to the caps actuates the heating device by placing the carbon electrode 23 into contact with the caps. As previously pointed out, the electrode, as soon as it comes in contact with a cap, becomes heated due to completion of a circuit through the transformer and heats the cap. As soon as the caps are heated by the device 21, soldering of the wire stems of the closures to the caps is effected by bringing a solder wire into contact with the bent ends of the stems and the top walls of the caps. As soon as the solder wire strikes the heated metal, it melts and the molten metal strikes, flows around and over the bent ends of the wire stems. As soon as the solder solidifies, as the result of cooling of the caps, a permanent connection is effected between the stems and the caps. As the bottle closures are rotated out of range of the heating device 21, they are ejected or discharged by manipulation of the ejector 29.

The herein described apparatus is exceedingly simple as far as construction is concerned and contemplates an efficient and quick assembly of the wire stems and screw caps of the bottle closures.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an apparatus for assembling a bottle closure of the type that comprises a sheet metal cap and a metallic stem depending from the cap and having its upper end soldered to the top wall of the cap and a swab at the lower end thereof, the combination of a supporting structure, a member mounted on the structure and provided with means for holding the cap of the closure in an inverted position, a second member mounted above, and held at a fixed distance from, the first mentioned member and provided with means for holding the swab over and against sidewise displacement with respect to the cap and so that the stem assumes an upstanding position over the cap and the end thereof opposite the swab rests on the inner face of the top wall of the cap, and heater means associated with the supporting structure for use in soldering the stem to the cap while it rests on said top wall as the result of the holding effect of said second mentioned holding means.

2. In an apparatus for assembling a bottle closure of the type that comprises a sheet metal cap and a metallic stem depending from the cap and having its upper end soldered to the top wall of the cap and a swab at the lower end thereof, the combination of a supporting structure, a member mounted on the structure and provided with a hole-formed socket for holding the cap of the closure in an inverted position, a second member mounted above, and held at a fixed distance from, the first mentioned member and provided with a hole formed socket in substantially vertical alignment with the socket in said first mentioned member for holding the swab against sidewise displacement with respect to the cap and so that the stem assumes an upstanding position over the cap and the end thereof opposite the swab rests against the inner face of the top wall of the cap, and heater means for use in soldering the stem to the cap while it rests on said top wall of the cap as the result of the holding effect of the socket in said second member.

3. In an apparatus for assembling a bottle closure of the type that comprises a sheet metal cap and a metallic stem depending from the cap and having its upper end soldered to the top wall of the cap and a swab at the lower end thereof, the combination of a supporting structure, a member mounted on the structure and provided with means for holding the cap of the closure in an inverted position, a second member mounted above the first mentioned member and provided with a hole-formed socket in substantially vertical alignment with said member for holding the swab over and against sidewise displacement with respect to the cap and also that the stem assumes an upstanding position relative to the cap and the end thereof opposite the swab rests on the top wall of the cap, said second member being also provided with a laterally extending mouth for the socket for permitting insertion and removal of the swab, and heater means associated with the supporting structure and adapted for use in soldering the stem to the cap while it rests on said top wall of the cap as the result of the holding effect of the socket in said second member.

4. In an apparatus for assembling a bottle closure of the type that comprises a sheet metal cap and a metallic stem depending from the cap and having its upper end soldered to the top wall of the cap and a swab at the lower end thereof, the combination of a supporting structure, a member mounted on the structure and provided with a socket for holding the cap of the closure in an inverted position, a second member mounted above the first mentioned member and provided with a socket in substantially vertical alignment with the first mentioned socket for holding the swab over, and against sidewise displacement with respect to the cap and so that the stem assumes an upstanding position over the cap and the end thereof opposite the swab rests on the top wall of the cap, a spring mounted on said second member and arranged to bear against the swab and force the stem into firm abutment or contact with the cap top wall, and heater means associated with the supporting structure and adapted for use in soldering the stem to the cap while it is held by the spring in abutting relation with respect to the top wall of said cap.

5. In an apparatus for assembling a bottle closure of the type that comprises a sheet metal cap and a metallic stem depending from the cap and having its upper end soldered to the top wall of the cap and a swab at the lower end thereof, the combination of a supporting structure, a member mounted on the structure and provided with a socket for holding the cap of the closure in an inverted position, a second member mounted above the first mentioned member and provided with a socket in substantially vertical alignment with the first mentioned socket for holding the swab over, and against sidewise displacement with respect to the cap and so that the stem assumes an upstanding position over the cap and the end thereof opposite the swab rests on the top wall of the cap, said second member being also provided with a laterally extending mouth for its socket for permitting insertion and removal of the swab, a spring applied to said second member so that it overlies the socket therein and bears against the swab and urges the stem downwardly into its abutting relation with the cap top wall, and heater means associated with the supporting structure and adapted for use in soldering the stem to the cap while it is urged against the cap by said spring.

6. In an apparatus for assembling a bottle closure of the type that comprises a sheet metal cap and a metallic stem depending from the cap and having its upper end soldered to the top wall of the cap and a swab at the lower end thereof, the combination of a supporting structure, a member mounted on the structure and provided with means formed of insulating material for holding the cap of the closure in an inverted position, a second member mounted above the first mentioned member and provided with means also formed of insulating material for retaining the swab over the cap and holding the stem in abutment with the top wall of the cap, and a heater device adapted to be used in soldering the stem to the cap while the stem and cap are held in place by said means and comprising an element of conductor material arranged to contact with the cap and connected to one side of a source of electrical current, and a heatable electrode connected by a flexible conductor to the other side of the source of current and adapted when placed against the cap to complete the circuit and to become heated for stem-soldering purposes.

7. In an apparatus for assembling a bottle closure of the type that comprises a sheet metal cap and a metallic stem depending from the cap and having its upper end soldered to the top wall of the cap and a swab at the lower end thereof, the combination of a table, a member of insulating material mounted on the table and provided with a socket for holding the cap of the closure in an inverted position, a second member also formed of insulating material mounted above the first mentioned member and provided with a socket for holding the swab against sidewise displacement with respect to the cap and so that the stem assumes an upright position over the cap and the end thereof opposite the swab rests on the top wall of the cap, and a heater device adapted to be used in soldering the stem to the cap while the stem and cap are held in place and comprising a sheet of conductor material arranged between the first mentioned member and the table and so as to contact with the cap and connected to one side of a source of electric current, and a heatable electrode connected by a flexible conductor to the other side of the source of current and adapted when placed against the cap to complete the circuit and to become heated for stem-soldering purposes.

8. In an apparatus for assembling bottle closures of the type that comprises a sheet metal cap and a metallic stem depending from the cap and having its upper end soldered to the top wall of the cap and a swab at the lower end thereof, the combination of a supporting structure, a pair of rigid plate-members mounted on the structure one above the other and at a fixed distance apart and conjointly movable over said structure, the lower plate-member having means for holding the caps of the closures in an inverted position and the upper plate-member having means for holding the swabs over, and against sidewise displacement with respect to the caps and so that the stems assume an upstanding position over the caps and the ends thereof opposite the swabs rest on the top walls of the caps, and a heater device for use in soldering the stems to the caps while they are held in place located at one side of the supporting structure and adapted to have the closures brought successively into range thereof in response to movement of the plate-members over the structure.

9. In an apparatus for assembling bottle closures of the type that comprises a sheet metal cap and a metallic stem depending from the cap and having its upper end soldered to the top wall of the cap and a swab at the lower end thereof, the combination of a table, a pair of rigid, substantially circular plate-members supported on the table one above the other and at a fixed distance apart, the lower plate-member being provided around the margin thereof with an annular series of holes forming sockets for holding the caps of the bottle closures in an inverted position and the upper of the plate-members being provided around its margin with an annular series of holes forming sockets for holding the swabs over, and against sidewise displacement with respect to the cap, and so that the stems assume an upstanding position over the caps and the ends thereof opposite the swabs rest on the top walls of the caps, a heater device at one side of the table for use in soldering the stems to the caps while they rest on said top walls of the caps, and a mounting for the plate-members whereby the latter are conjointly rotatable in order to bring the closures successively into range of the heater device.

PAUL VAN CLEEF.